Figure 1:
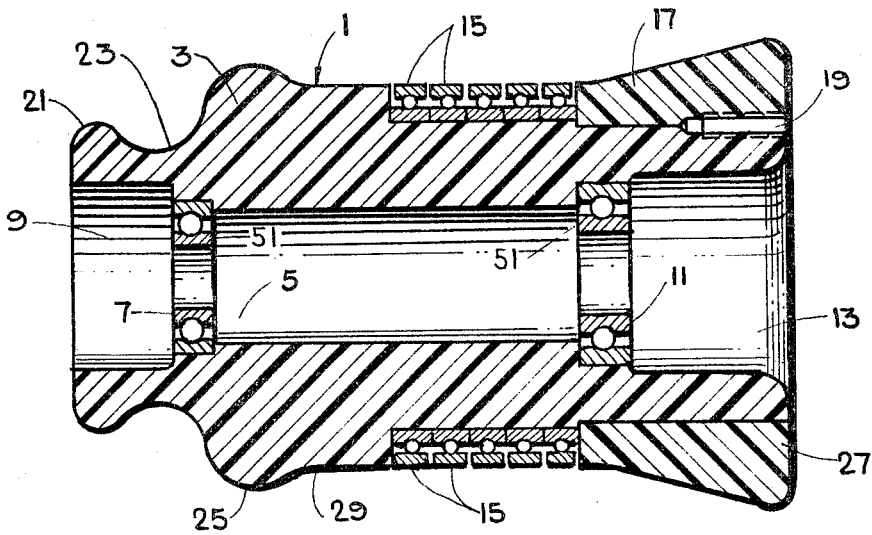

Oct. 11, 1966 V. E. HENLEY ET AL 3,278,361
TURN UP AND TURN DOWN TOOLS FOR LOW CROWN
TRUCK TIRE BUILDING DRUM
Filed Sept. 12, 1962 2 Sheets-Sheet 1

INVENTOR
VIRGIL E. HENLEY
RONALD W. PHILLIPS
BY Frank J. Earnheart
Frank C. Rote, Jr.
ATTORNEY

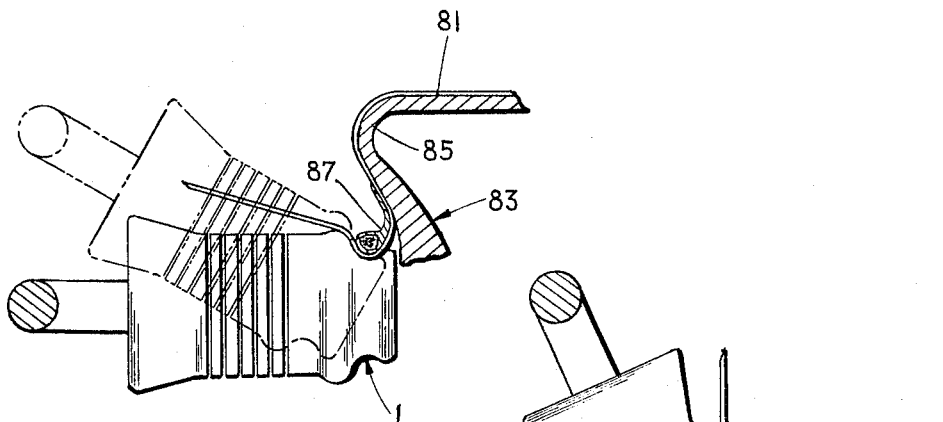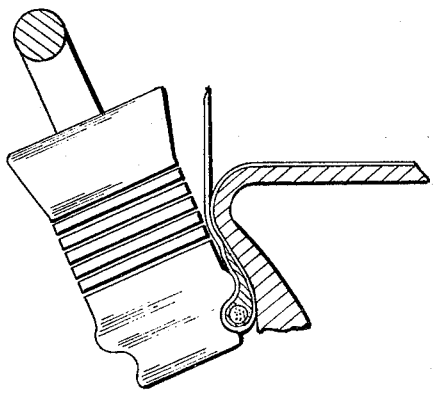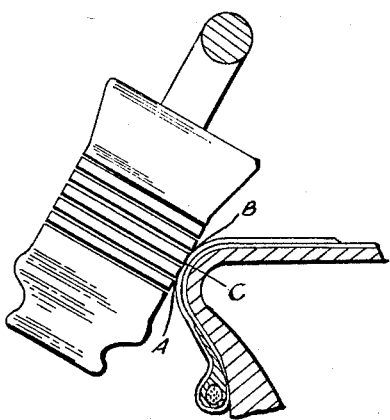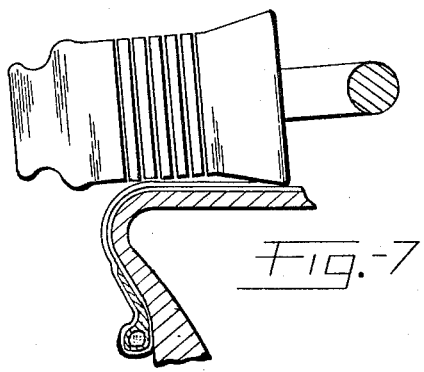

United States Patent Office 3,278,361
Patented Oct. 11, 1966

3,278,361
TURN UP AND TURN DOWN TOOLS FOR LOW CROWN TRUCK TIRE BUILDING DRUM
Virgil E. Henley, Akron, and Ronald W. Phillips, Tallmadge, Ohio, assignors to The General Tire & Rubber Company, a corporation of Ohio
Filed Sept. 12, 1962, Ser. No. 223,042
2 Claims. (Cl. 156—421)

This invention relates to apparatus used in the building of pneumatic vehicle tires and more particularly to an improved turn up and turn down tool for use against the drum of tire building machines.

Turn up and turn down tools are well known. These tools aid in the construction of tires when the tires are built on rotatable tire building drums. Tire building machines contemplating the use of tire building drums of this type are well known in the art and have been described, for example, in United States Patent No. 2,600,291 and No. 2,614,952, which patents are assigned to the assignee of the present invention.

Tools of the type contemplated in our invention are often referred to in the art as bead stitchers and are one of several different tools which are required for use in conjunction with modern automatic tire building machinery to facilitate construction of a tire.

Basically, in constructing a tire on the previously referred-to tire building drum, the tire fabric is wrapped around the drum with the lateral edges of the fabric overhanging the edges of the drum. These overhanging edges are folded in against the shoulders of the drum and then out and around a previously prepared bead which is placed against the folded-in edge. The resulting built-up body is often referred to as a carcass. This built-up carcass is then removed from the tire building drum and placed in a vulcanizing apparatus where the tire is formed and vulcanized. The shaped tire is, at the completion of the vulcanization, removed from the vulcanizing device and allowed to cure. Thereafter, it may be mounted on a rim.

In the building of a tire the various layers of fabric must be applied in a very careful manner or an imperfection will result in the finished tire which will render it defective and perhaps useless. It is particularly important, for example, that any occluded air be forced out from between the various layers of fabric prior to vulcanization. Otherwise, there may result, in the finished tire, bubbles and imperfections which render it useless or decrease its utility for most applications.

Another problem encountered in the building of a tire is that the tire fabric is not uniformly folded and compressed as it is forced down around the edges of the rotating tire building drum during the building of a tire. If the folding is not uniform and the compression of the fabric is not equal, the resulting tire may be off balance and require rebuilding or remodeling prior to any use thereof.

It is generally difficult to obtain this uniform folding over at the edge or shoulder of the rotating tire drum. The basis of this difficulty is that at different positions on the shoulder of the drum adjacent sections of the tire are turning at different linear speeds so that application of a tool across two of these sections creates a drag on one section relative to the adjacent section. This will be made clear by reference to the hereinafter described drawings. Because of this difference in speed at which adjacent sections of the tire body are moving as they are turned down, the application of the conventional tire building tool to the edge tends, even with the most expert manipulation, to sponge or otherwise fold over the edge of the rotating tire drum in a non-uniform manner.

We have now found that we may build a tire according to the previously known method without the heretoforementioned difficulty usually encountered in turning the fabric down over the edge of the rotating tire building drum. This is accomplished by using the novel tire building tool of our invention.

This novel tool contemplates an intermediate portion containing at least three freely rotatable disc elements. These rotatable disc elements are free to rotate with respect to each other and with respect to the body of the tire building tool. In order to accomplish the desirable result of our invention it is necessary that these rotatable discs have a total thickness or width equal to the distance, on the tire building drum with which they are used, from the point on the drum where curvature at the edge or shoulder thereof commences to that portion where the curvature of the drum reverses.

The object and advantages of our invention will become clear when the following description is read in conjunction with the accompanying drawings. The invention comprises the features hereinafter fully described and particularly pointed out in the claims while the following description in the annexed drawing sets forth in detail certain illustrative embodiments which, however, are but one of the various ways in which the principles of the invention may be employed.

In the drawings wherein like parts are numbered alike:
FIGURE 1 is a central, longitudinal, cross-sectional view showing a preferred form of our tire building tool,
FIGURE 2 is a plan view of the holder adapted to handle the tire building tool of our invention as well as other tire building tools, said holder being an attachment to the chassis of a tire building machine,
FIG. 3 is a view of the tire building tool in cross section supported on the tool holder,
FIGURES 4 through 7 are a series of diagrammatic views illustrating our tire building tool during a typical sequence of operative steps encountered in the building of a tire.

Figure 2:
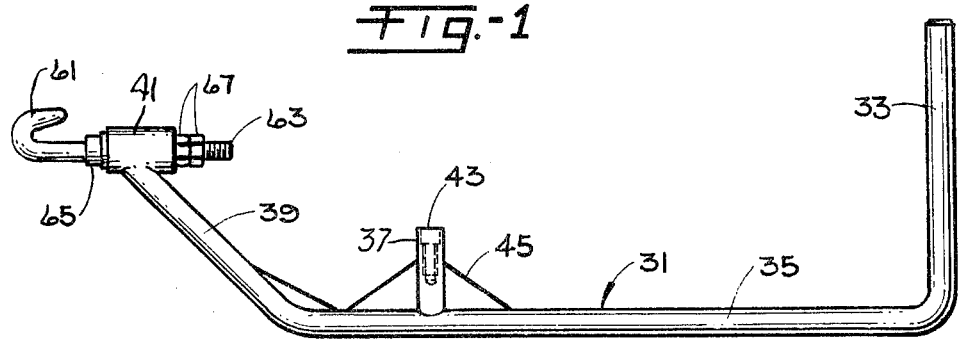
Figure 3:
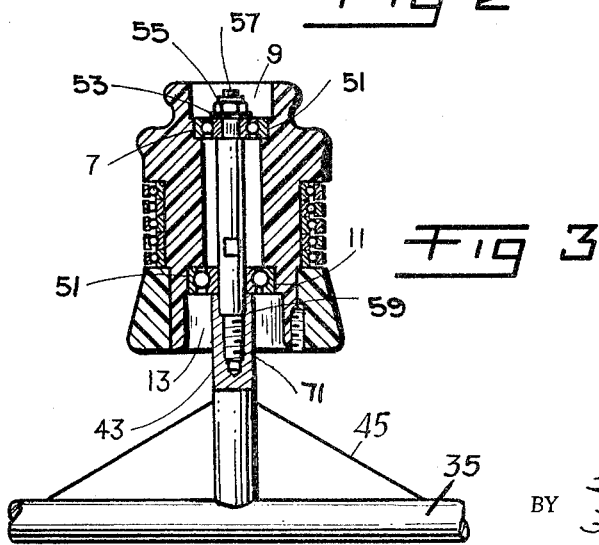

Referring now to the drawings, especially FIGURES 1 and 2, with more particularity the stitching device or tool is generally denoted by the numeral 1. The tool is constructed of a material such as nylon which combines the attribute of a low coefficient of friction with the further desirable attributes of relatively high hardness, machineability, light weight, and high impact and tensile strength.

The stitching tool is comprised of a body member 3 having a central shaft aperture 5. Located at the proximate end of the tool is a first proximate recess 7 adapted to receive one of a set of bearings 51, and a second proximate recess 9 which is adjacent to recess 7. At the distal end of the body are located first distal recess 11 adapted to receive the other of the set of bearings 51, and a second distal recess 13.

The body 3 is further adapted to receive and co-act with circumferential rotary bearings 15, five of which are shown. If preferred, more or fewer bearings may be used depending upon the particular problem encountered. The body member 3 is also adapted to receive circumferential flanged member 17. Circumferential flanged member 17 locks circumferential rotary bearings 15 in place and, in turn, is secured to body member 3 by means such as a bolt which is adapted for interaction with hole 19 which hole is partially in body member 3 and partially in circumferential flanged member 17. Other methods of securing the bearings to the body may be used.

The body member 3 which is of a generally cylindrical configuration has a first circumferential convex portion 21, a first circumferential concave portion 23 having a lesser diameter than said first convex portion, a second convex portion 25 having a diameter greater than said first convex portion, a tubular central section 29 at the surface portion of which are located circumferential roller bearings 15.

The tool is mounted on a holder which is generally denoted 31.

The holder 31 has a handle portion 33, a rod portion 35, a tool holding portion 37, an angular portion 39, and a mounting means 41 mounted on said angular means 39. The holder 31 is adapted to interact with a hook 61 by means of threaded bar 63, collar 65, and lock nuts 67. Other means of attaching a hook may be used such as, for example, welding. The hook is used to attach the holder to a tire building machine, not shown, by mounting the tool on a bar which is mounted on the tire building machine. The tool is mounted so as to have the axis of the bar on which it is mounted parallel to the axis of rotation of the tire building drum.

Referring particularly to FIGURE 3 the tool holding portion of the tool holder is supported on the rod portion 35 by supporting gussets 45. The tool holding portion is tapped with a threaded hole 43 to accept threaded rod 71.

The tool is mounted on the mounting portion by inserting it together with bearings 51 over the threaded hole 43. There is then inserted threaded rod 71 which is threaded at both ends. This threaded rod 71 is screwed into hole 43 and then washer 53 is placed on rod 59, and the whole assembly is locked by lock nut 55. Means other than that shown may be used for mounting the tool on the handle.

In general, the building of a dual-bead tire such as a 10.00 x 20 truck or bus tire on a rotating collapsible drum will involve, using the novel tool of the present invention, the following steps:

(1) The first ply group (comprising four plies of tire fabric, for example) is wrapped around the drum generally denoted as 83 and plies may be stitched together by engaging the stitching disc 1 therewith while said disc is moved axially toward an end of the drum; alternatively a sleeve prepared previously may be inserted on the drum;

(2) The overhanging ends of the first ply group are then turned over the drum shoulders 85, again by appropriate manipulations of a stitcher disc 1;

(3) The bead 87 is pressed against the inturned plies;

(4) The first ply group is then pressed against the inside of the bead and flared out and pressed against he outside of the bead (such as shown in FIGURES 4 and 5). If the tire is of light duty and contains only one bead then the tire is completed as in Steps 8 and 9 below or it may be completed as set out in Steps 5 through 9.

(5) The second ply groups, say of four more plies, is then applied around the drum 88 and stitched and turned in as described in Steps 1 and 2 above;

(6) The second ply group is then worked as described in Step 4 to encompass the second bead;

(7) The final ply group, of two plies, for example, is then applied to the drum 83 and also the tread and sidewall stock followed by stitching with a stitching disc;

(8) The overhanging stock is then turned down over the shoulder as before and the woven fabric rim chafing strip is stitched around the beads and tucked in between the first bead and the end of the drum 83; and (9) At this stage the dual beads may be stripped from the drum shoulders and the drum collapsed for removal of the carcass therefrom.

A study of FIGURES 5 and 6 will indicate the advantage of the tool of this invention. In FIGURE 6 the two points furthest apart which can be simultaneously exposed to the surface of the tool are denoted A and B while an intermediate point is denoted C. The building drum rotates about an axis such that the points A and B may be considered as the radii of two circles. Assume these two circles have diameters of 23 and 24 inches respectively, a figure which is typical of a commercially used drum of this type. The difference in rate of these two points only an inch apart would then be close to 950 feet per minute. This is a considerable sum.

This difference is calculated by determining the circumference ($2\pi r$), multiplying by the speed, 300 r.p.m., which is a typical speed of a commercial machine, to get linear speed and then finding the difference. It is obvious that if a tool of the type heretofore used were applied to these two points, A and B, on a tire carcass rotating at that speed that considerable drag would be created. This drag could cause defects in the tire.

In contrast, using the tool of our invention, equal pressure can be applied to the two points, A and B, but no drag will result because of the rotation of the discs of the tool of the invention will compensate for the drag thereby permitting construction of a defect-free tire.

The foregoing describes a novel and improved tire building tool. By using this tool embodying more than two rotating discs, it is possible to build tires less susceptible to development of defects and thus reduce the number of defective tires produced while increasing the rate at which the tires are produced.

We claim:

1. A tire building tool, particularly adaptable for the simultaneous stitching of portions of ply fabric overlying the shoulder of a tire building drum and moving at different lineal speeds comprising:

(A) A generally cylindrical body member adapted to be mounted upon a holder and to rotate about a central axis to form a stitching surface, and (B) At least three closely spaced discs, of substantially equal outer diameter, independently and concentrically rotatable about said central axis, and comprising a portion of said stitching surface intermediate the ends of said body member, said portion having a width at least equal to the linear distance at the shoulder of the drum where the curvature commences to the point where the curvature reverses.

2. A tire building tool particularly adaptable for stitching the portions of a tire carcass overlying the shoulders of a low crown building drum comprising:

(A) A body member adapted to be mounted upon a holder and to freely rotate about a central axis to form a first stitching surface shaped to conform to the outside contour of the tire bead and a second flanged stitching surface remote from said first surface, and (B) At least three closely spaced, independently rotatable bearings of approximately equal outer diameter surrounding a portion of said body member intermediate said first and second stitching surfaces and cooperating therewith to form a continuous stitching surface, concentric about said central axis, the total width of said bearings being at least equal to the linear distance at the shoulder of said drum between the point where a given curvature commences to the point where said curvature reverses.

References Cited by the Examiner
UNITED STATES PATENTS

| | | | |
|---|---|---|---|
| 1,162,425 | 11/1915 | Wilcox | 156—421 |
| 1,179,528 | 4/1916 | Kaufmann | 156—421 |
| 1,465,177 | 8/1923 | Richter | 156—421 |
| 1,527,175 | 2/1925 | Desautels | 156—421 |
| 1,762,850 | 6/1930 | Vrbanac | 156—421 |

EARL M. BERGERT, *Primary Examiner.*

HAROLD ANSHER, ALEXANDER WYMAN,
*Examiners.*